United States Patent Office

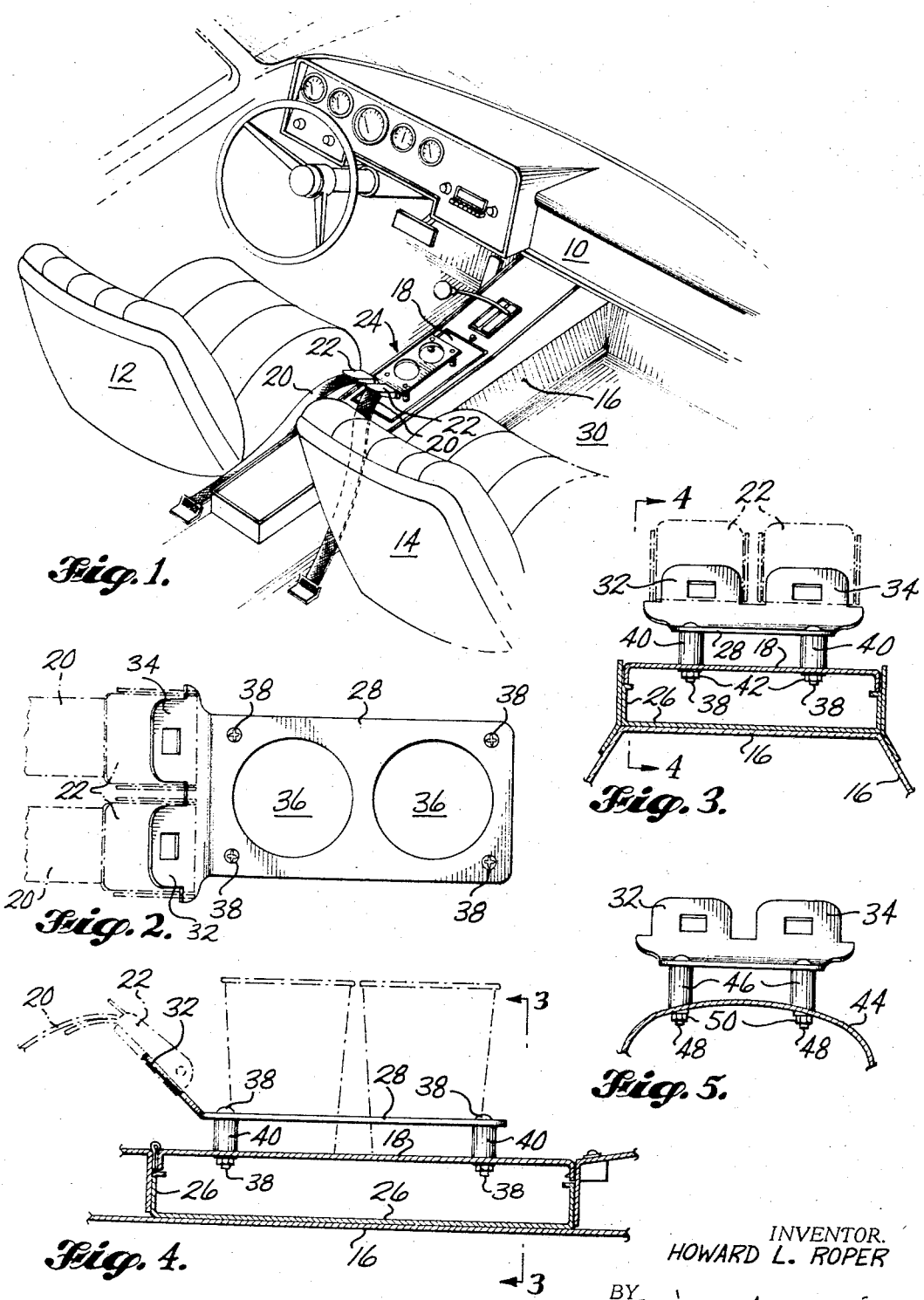

3,427,042
Patented Feb. 11, 1969

3,427,042
SEAT RETAINING AND POSITIONING MEANS FOR BUCKLE END PORTION OF A SEAT BELT
Howard L. Roper, 1111 S. Highland Ave., Tacoma, Wash. 98465
Filed Mar. 20, 1967, Ser. No. 624,456
U.S. Cl. 280—150        1 Claim
Int. Cl. B60r 21/10, 7/00

ABSTRACT OF THE DISCLOSURE

In general, this invention relates to a storage and positioning device for the buckle-end portions of automobile safety seat belt. More specifically, the invention finds its greatest advantages in connection with automobiles equipped with laterally spaced apart bucket seats, a separate safety seat belt for the occupant of each such seat, and where the seat belts terminate with adjacently disposed buckle-end portions. Also, the invention finds great utility in an automobile so equipped which has the additional features of a "drive shaft hump" and/or a console disposed laterally between such seats.

---

*Seat retaining and positioning means for buckle end portion of a seat belt*

My invention relates to a novel and useful automobile storage and positioning device for the buckle-end portions of automobile safety seat belts.

It is a desired, and undoubtedly will be a required, safety standard to equip automobiles with safety seat belts. It is also common to arrange such seat belts so that the buckle-end portions are disposed centrally (laterally considered) of the automobile and with the tongue-end portions of the seat belts disposed outwardly and adjacent the automobile doors. This primarily for the reason of protecting the said buckles, as less damage will result in closing an automobile door against a tongue-end portion of a seat belt than would result upon the closing of such a door against a buckle-end portion of a seat belt.

In connection with automobiles so equipped with seat belts and where such automobiles have the additional appointments of laterally spaced bucket seats, one on the right side of an automobile and the other on the left side of an automobile, it is common to have the "drive shaft hump" extending lengthwise of the automobile and disposed between the spaced bucket seats, and with the said "hump" often covered by a service console.

It is an object of my invention to dispose a safety seat belt buckle-end portion storage and positioning device on said "drive shaft hump," or the console thereon, or the lid cover of such console.

It is a further object of my invention to provide a seat buckle storage and positioning device in combination with a service bar having elevated openings to embrace the sides of articles, such as cans, glasses, or the like, when such articles are resting upon the console top portion or on the "drive shaft hump." In this manner the "drive shaft hump" or the console, or the lid of such console, is adapted to support such articles at the bottoms thereof and the elevated openings of the service bar are adapted to support said articles at their sides and at a suitable height from their bottoms.

Another object of my invention is to provide a fixed, predetermined storage position of the seat belt buckle-end portions of the seat belts so that the location thereof is determined as one convenient for the automobile passengers to locate the same and readily grasp the same. At the same time by providing for a definite and positive fixed position of the seat belt buckle portions when not in seat belt buckled position, the said seat belt buckle portions will not be in haphazard and indiscriminate positions where they would be difficult to find, be sat upon by passenger or a driver, or rattled by contact with portions of the automobile floor or seats.

It is another object of my invention to provide storage means for the seat belt buckle-end portions which angularly position such portions so that they are directed to be readily grasped to be moved from storage position and they are then angularly positioned so that in the same motion they may be moved into belt buckled position.

Another object of my invention is to provide a combination service bar and a seat belt buckle-end portion storage and positioning device which will be efficient and which will not detract from the interior appearance of the automobile.

Another object of my invention is to provide such a device which will be inexpensive to manufacture, be simple of construction, and which can be readily installed regardless of the particular automobile in which it is installed, be very rigid and of substantially long life, and relatively free of installation or removal problems.

The above mentioned general objects of my invention, together with others inherent in the same will become apparent in the description of the construction and operation of my invention, as more fully herein described and claimed, reference now being made to the accompanying drawings forming a part hereof, wherein like reference numerals refer to like parts, in which:

FIGURE 1 is a fragmentary perspective view of a portion of the interior front seat area of an automobile equipped with the device of my invention;

FIG. 2 is a detached plan view of a device of my invention, with fragments of a seat belt secured thereto and shown in phantom;

FIG. 3 is an end elevational view, with parts shown in section, of the structure of FIG. 2 and further showing the same attached to a fragment of a console of an automobile and taken substantially on broken line 3—3 of FIG. 4;

FIG. 4 is a side elevational view, with parts in elevation, and taken substantially on broken line 4—4 of FIG. 3 and further showing in phantom two drinking glasses in the receptacle holder of my invention; and FIG. 5 is a fragmentary end elevational view of a modified form of my invention.

Now referring more specifically to the drawings and to FIG. 1 thereof, a conventional automobile front area portion is illustrated. Some of the features illustrated, comprise: a dash 10, laterally spaced apart bucket seats 12 and 14, drive shaft hump 16, console cover 18, seat belt buckle end-portion 20, and seat belt buckles 22. Also, in FIG. 1 of the drawings my invention is generally indicated by the numeral 24.

In FIGS. 3 and 4 of the drawings, the relation of a console and a drive shaft hump of a typical automobile is illustrated, wherein the console body 26 is secured, by any conventional means, to the drive shaft hump 16. The console cover 18 is hingedly secured to the console body 26 to provide for ready access to the interior of the console.

In FIGS. 2, 3, and 4 of the drawings, the details of construction of one form of my invention are illustrated. Here a plate base portion 28 of my device is provided and which, when in use, lies in a plane substantially horizontal and parallel to the floor 30 (FIG. 1) of the automobile. A base tongue portion providing two tongue portions 32 and 34 connects with and is preferably formed integral with the base portion 28. The tongue portion 32–34 is bent relative to the base portion 28 and extends upwardly and away from said base portion 28, and preferably at an angle thereto in the order of 135°. When in use the tongue portion 32–34 extends upwardly and rearwardly (of the automobile) and the angle of the upward incline is one most convenient for a user (left hand of the party seated at the right side of an automobile—right hand of a party—generally the driver—seated at the left side of the automobile) to readily release a buckle 22 from a tongue 34 or 32 and to engage said buckle with the normal tongue (not shown) of the seat belt so as to wrap the seat belt about and secure the same in safety position as respects the particular party involved. The said tongue portions 32 and 34 are preferably of a design to match the said normal tongues of the seat belts so that said buckles 22 will firmly engage with and be releasably held by either the tongue portions 32 or 34 or by the said normal tongues of the seat belts. Also, the base portion 28 is provided with a plurality of vertical side wall engaging retaining openings 36.

The construction just described lends itself to economical and mechanical production in that the single plate can be stamped to provide the parts 28, 32, 34, and 36. Also, the original plate can be of any desired thickness, such as ⅛″, for rigidity of the final device and yet stamping processes are highly practical. The material employed may be metal and stamped as indicated. Also, the material employed may include various suitable plastics which are cast into the final form or are formed from a single sheet of plastics. Also, when desired, coatings, such as chrome-nickel, and the like, may be used to increase decorative appearances of the final device.

Base plate portion 28 is provided with a plurality of holes, through which a plurality of bolts 38 may pass. Preferably such holes form a rather long narrow rectangular pattern. Thus, the device may be used as a template and laid on the cover of the console or on the top of a drive shaft hump and the hole centers marked for drilling the holes through the cover of the console or through the drive shaft hump. By having such a pattern of holes in the base plate portion 28 and employing the said as a template, I have found that devices of my invention have rather wide universal application on all automobiles of today having the features indicated.

In FIG. 5 of the drawings I have illustrated my device installed on the drive shaft hump 44 of an automobile and in FIGS. 1 to 4, inclusive, on the cover 18 of a console 26. In either case, the hump 44 or the cover 18 has been drilled so that the hole pattern matches the hole pattern in the base portion 28. Spacers 40, bolts 38, and nuts 42 of the construction of FIGS. 2 to 4, inclusive, or the spacers 46, bolts 48, and nuts 50 of the construction of FIG. 5, secure my device rigidly and firmly in place and ensure against accidental dislodgment or displacement of the device. Self threading screws may be used in place of the bolts 38 and nuts 42 or of the bolts 48 and nuts 50 where securance thereby is deemed adequate.

It will now become apparent in view of the foregoing that I have provided a retaining and positioning means for the buckle-end portions 20–22 of a safety seat belt which is formed of a tongue-end portion and a releasably interlocking buckle-end portion. My construction includes a base portion 28 adapted to be connected with the floor area of an automobile, such as to the console cover 18 or to the drive shaft hump 44. Next, a base tongue portion 32 is provided which preferably comprises two tongue portions 32 and 34 as it is common practice to provide adjacent buckle portions of seat belts and with the tongue portions of seat belts on the outside or adjacent the doors of an automobile. This maintains the buckle portions away from the doors and thus eliminates the possibility of crushing the buckle portions by closing the doors of the automobiles against said buckle portions. The tongue portions 32 and 34 releasably interlock with the buckles 22 so that even when said seat belt buckles 22 are not in passenger holding position, the said seat belt buckles 22 will be releasably interlocked with an appropriate tongue portion to prevent said buckles from being haphazardly stowed and thus possibly interfere with the seating of passengers or lost under the seats and the like.

Preferably, the construction shown is with the plate base portion 28 integral with the tongue portions 32. Also, the tongue portions 32 extend angularly upwardly and away from the base portion 28 and preferably at an angle substantially 135°. This disposes and positions seat belt buckles 22 at an angle and a location so that a user can readily grasp a seat belt buckle 22 and have the same positioned in a hand so that by a continuous movement, the seat belt buckle can be moved into position to releasably interlock with the tongue-end portion of the seat belt and thus lock the seat belt about the waist of the automobile occupant using said safety seat belt.

Also, preferably, the said base portion 28 is elevated above the floor area as being elevated above the console cover 18 by spacers 40 or being elevated above the drive shaft hump 44 as by the spacers 46 (FIG. 5). By having the said base portion 28 so elevated, then by the use of receptacle retaining openings 36, I have provided a service bar so that receptacles, as cans, glasses, and the like, can be readily stored at a convenient location to either one of the passengers of the seats adjacent the device of my invention.

Also, preferably, my device in being used in connection with an automobile, is used with automobiles equipped with the appointments of bucket seat and with either a console 26 or a drive shaft hump 44 disposed between the said two bucket seats. In such combination, preferably the tongue portions 32 are angularly disposed to the base portion 28 so that said tongue portions 32 and 34 extend angularly upward and rearwardly of the automobile and away from the base portion 28. This conveniently stows the seat belt buckles 22 in a position where they are releasably interlocked to the tongue portions 32–34, and at the same time the said seat belt buckles are disposed in a convenient position for the passengers in the said bucket seats. Next, in combination with my device and an automobile, I have provided means to elevate the base portion 28 above the floor area so that when receptacle openings 36 are employed, a receptacle may be disposed through said receptacle opening 36 and have the bottom of the receptacle rest on the floor area of the automobile, such as on the console cover 18 or on the drive shaft hump 44.

By having a relatively narrow and long hole pattern in the base portion 28 through which bolts 38 are fastened, the base portion 28 may be employed as a template and disposed over the console cover 18 or over a drive shaft hump 44 and hole centers marked so that the said console cover 18 or the said drive shaft hump 44 can be drilled with a matching pattern of holes and thus my device may be readily inserted on substantially all cars and thus has universal application despite the particular manufacture of car involved.

Obviously, changes may be made in the forms, dimensions, and arrangements of the parts of my invention without departing from the principle thereof, the above setting forth only preferred forms of embodiment of my invention.

I claim:

1. In combination with an automobile equipped with laterally spaced apart bucket seats, a drive shaft hump extending longitudinally of the automobile and between said spaced apart bucket seats, a console having a top cover and disposed on and connected with said drive shaft hump, and seat safety belts terminating with adjacent buckle-end portions, which safety seat belts are each formed of a tongue-end portion and of a releasably interlocking buckle-end portion, comprising a base portion provided with receptacle engaging openings therein to hold the side upper portions of receptacles and disposed over the top cover of said console; spacer means between said top cover and said base portion; means detachably securing said base portion with said top cover, whereby receptacles will be supported at their bottoms by said base means and at their upper side portions by said top cover of said console; and a base tongue portion connected with the base portion and extending upwardly and away from said base portion and in a direction rearwardly of said automobile, said base tongue portion mating with and releasably interlocking with the buckle-end portion of said seat belt, said base tongue portion being angularly disposed to the base portion at an angle of substantially 135°.

References Cited

UNITED STATES PATENTS

| 3,356,409 | 12/1967 | Belsky et al. | 296—24 |
| 3,083,035 | 3/1963 | Ottosson | 280—150 |
| 3,132,892 | 5/1964 | Stevens | 296—37 |

LEO FRIAGLIA, *Primary Examiner.*

JOEL E. SIEGEL, *Assistant Examiner.*

U.S. Cl. X.R.

296—24